United States Patent [19]

Drumheller

[11] Patent Number: 5,165,081
[45] Date of Patent: Nov. 17, 1992

[54] AUXILIARY CLAMP-ON MIRROR

[76] Inventor: Dennis W. Drumheller, 2504 Roxy St., Simi Valley, Calif. 93065

[21] Appl. No.: 736,974

[22] Filed: Jul. 29, 1991

[51] Int. Cl.⁵ ............................ G02B 7/18; B60R 1/04
[52] U.S. Cl. ................................... 359/854; 359/864; 359/865; 248/478; 248/481; 248/488
[58] Field of Search ............... 359/842, 854, 855, 864, 359/865, 871, 872, 879, 881; 248/468, 476, 477, 478, 479, 481, 488

[56] References Cited

U.S. PATENT DOCUMENTS

| | | | |
|---|---|---|---|
| 3,790,117 | 2/1974 | Winkler | 359/865 |
| 4,359,266 | 11/1982 | Rohlf et al. | 359/881 |
| 4,702,572 | 10/1987 | Cossey | 359/881 |

FOREIGN PATENT DOCUMENTS

| | | | |
|---|---|---|---|
| 337454 | 6/1921 | Fed. Rep. of Germany | 248/478 |
| 177391 | 3/1922 | United Kingdom | 248/478 |

Primary Examiner—Bruce Y. Arnold
Assistant Examiner—R. D. Shafer
Attorney, Agent, or Firm—David O'Reilly

[57] ABSTRACT

An auxiliary mirror that can be easily attached to a vehicle's existing rear-view mirror to improve visibility of the back seat or blind spots. The auxiliary mirror is mounted on a pair of telescoping brackets for attachment on either side and above or below the existing rear-view mirror. The pair of L-shaped brackets have intersecting back plates and arms that clamp onto the upper and lower edges of the existing rear-view mirror. The brackets are clamped with a finger nut and bolt in one embodiment and with a stiff coil spring in another.

4 Claims, 2 Drawing Sheets

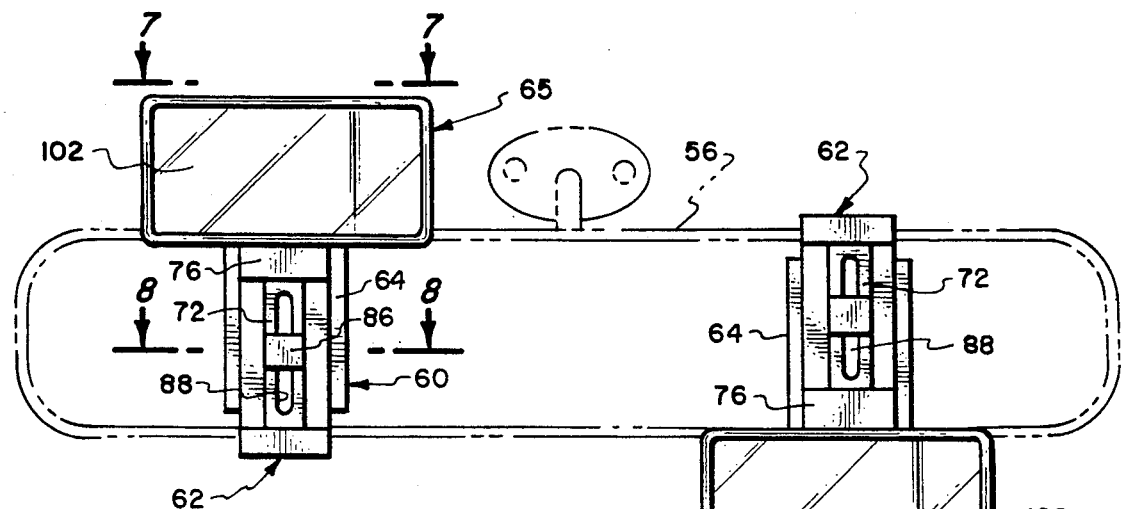
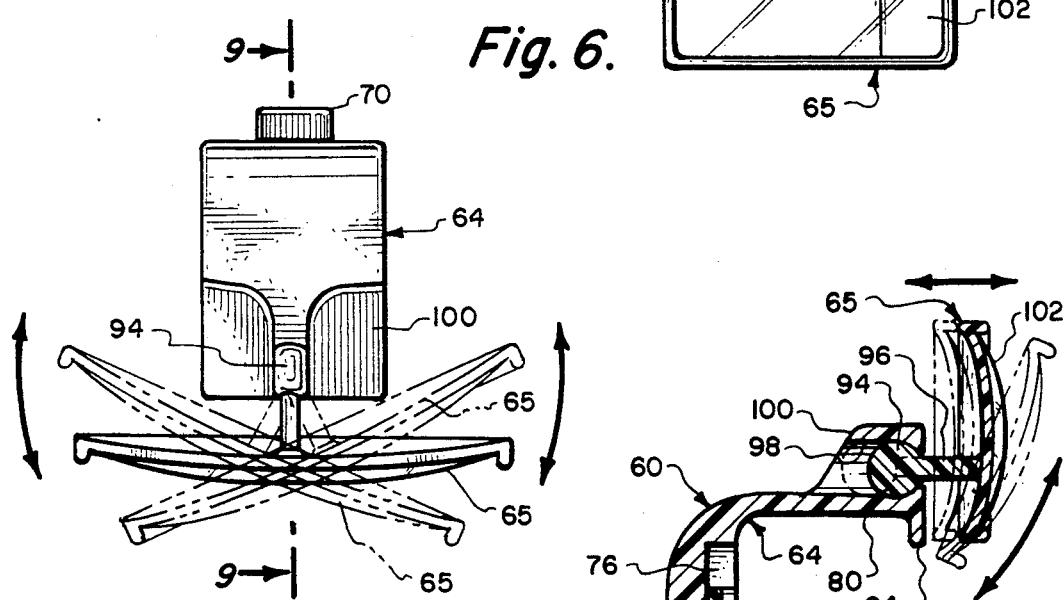
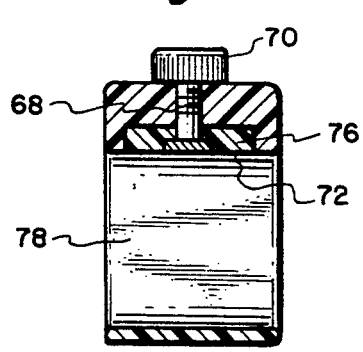
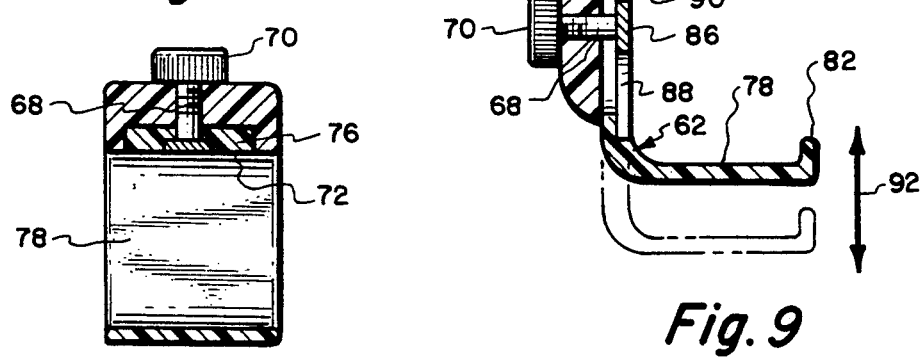

AUXILIARY CLAMP-ON MIRROR

FIELD OF THE INVENTION

This invention relates to auxiliary mirrors and more particularly relates to an auxiliary mirror that clamps on existing vehicle rear-view mirrors.

BACKGROUND OF THE INVENTION

A constant problem with all rear-view mirrors in vehicles is the existence of a blind spot. This blind spot is on the passenger's side and right, rear quarter. It is the cause of frequent accidents. Because of this blind spot drivers always must be sure to turn their head to the left whenever changing lanes or making left turns.

Attempts to solve this problem include the use of side view mirrors on each outside door of the car. While this helps it is not a complete solution because the mirror is some distance from the driver who frequently has to move his head to be able to see all angles.

Another attempt to solve this problem is to replace the rear-view mirror with a mirror over the existing rear view mirror that may span the entire width of the car. This replacement mirror has a series of mirrors that supposedly provide a wide angle view on both sides of the car. It is however unsightly and not effective because of the different planes of view created by the multiple mirrors. It can also interfere with visor movement.

There is also the need for providing a mirror to be able to see children in the back seat of the car. Often, when driving, parents will adjust the rear-view mirror to be able to see the back seat losing the ability to use the mirror for its intended purpose. One solution to this problem involves a clamp-on mirror comprised of two flexible plastic arms that snap together around the mirror having an auxiliary mirror that can be adjusted for viewing the rear seat while leaving the original rear-view mirror adjusted for its intended purpose. However, a problem with this mirror is that it can become loosen over a period of time and not maintain the proper viewing angle. It would be advantageous if an auxiliary mirror can be provided that can be securely clamped to the existing rear-view mirror on either side, top or bottom and remain secure over long period of time.

A variety of mirrors have been invented to solve the problems in the area of the blind spot or watching children in the back seat. Mirrors that attach to the windshield in front of the driver (e.g. via suction cups, etc.) can be helpful but create a depth-in-field transition problem for the eyes because they are not in the same plane-of-view as the rear-view mirror. Spherical mirrors have also been tried but offer too much of a view and the objects reflect them and tend to be too distant and sometimes too distorted to be of use. If such mirrors are attached to existing rear-view mirrors it reduces the necessary viewing area and also provides a distraction to the driver. This can compromise safety.

Wide rectangular mirrors have been provided that fit over existing rear-view mirrors but are normally much larger in size that what the vehicle manufacturer has allowed for. These mirrors tend to interfere with sun-visor operation. Another solution is the rectangular multi-element mirrors that are used to replace existing rear-view mirrors entirely and require mounting hardware for their installation. These mirrors can cause interference with proper operation of the sun-visors and can also be distracting because of the differing views in the multi-element mirrors. While they provide a large viewing angle they allow a great deal of light reflection during nighttime use. They can cause a compromise of safety.

It is therefore one object of the present invention to provide an auxiliary mirror that clamps on the existing rear-view mirror.

Yet another object of the present invention is to provide an auxiliary mirror that provides a positive clamping action on the existing rear-view mirror but is easily removed for adjustment or changing of positions.

Still another object of the present invention is to provide an auxiliary rear-view mirror that is clamped on existing rear-view mirror without the need for any tools.

Yet another object of the invention is to provide an wide range of existing rear-view mirrors.

BRIEF DESCRIPTION OF THE INVENTION

The purpose of the present invention is to provide an auxiliary rear-view mirror that can be clamped on an existing rear-view mirror that will not interfere with normal operation of the mirror.

The purpose is met by a rear-view mirror comprised of a pair of L-shaped supports or brackets that interlock, having arms that clamp around the back of an existing rear-view mirror. The two brackets telescopically engage and are clamped by means of a spring biasing the two supports toward one another securely clamping them on the frame of an existing rear-view mirror. A convex auxiliary mirror is mounted on one of the supports in a gimbal arrangement of a ball on the mirror fitting a socket on the arm of the support. The support arms are symmetrical so that the mirror can be clamped on either side of the existing rear-view mirror on the top or on the bottom.

The auxiliary mirror is held in place by a strong spring mounted between a pair of ears on the supports that bias the support arms toward each other securely clamping the mirror on the existing rear-view mirror. The auxiliary mirror is installed by applying force on the two ears forcing them together which displaces the arms away from each other allowing the support to be placed around the frame of the existing auxiliary mirror. When the ears are released the spring forces the two support arms together securely clamping the auxiliary mirror on the existing rear-view mirror. A lip on the support arms prevent the auxiliary mirror from slipping off.

In a second embodiment the two supports are telescopically engaged and held in place by a bolt and finger nut. The two L-shaped brackets telescope together in a tongue and groove fashion with one support having a groove for receiving tongues formed on the second support. A lengthwise slot in the inside bracket is aligned with a hole in the outside bracket to allow a bolt having a square head to be secured by a finger nut.

To install the mirror the finger nut is loosened and the two supports separated. The supports are the placed around the back of the existing rear-view mirror and closed securely on the frame of the mirror. The finger nut is then tightened securely clamping the auxiliary mirror on the rear-view mirror frame. A convex auxiliary mirror is supported in a socket by a ball mounted on a stem attached on the auxiliary mirror frame. Preferably the mirror is a curved or compound convex mirror to provide a wide angle view with minimum distortion.

The above and other novel features and advantages of the invention will be more fully understood by the following detailed description and accompanying drawings in which:

BRIEF DESCRIPTION OF THE DRAWINGS

FIG. 6 illustrates a second embodiment of the auxiliary mirror and the method of mounting the mirror on an existing rear-view mirror.

FIG. 7 is a top view of the auxiliary mirror taken at 7—7 of FIG. 6 illustrating adjustment of the auxiliary mirror.

FIG. 8 is a sectional view taken at 8—8 of FIG. 6.

FIG. 9 is a sectional view taken at 9—9 FIG. 7.

DETAILED DESCRIPTION OF THE INVENTION

Figure 1:
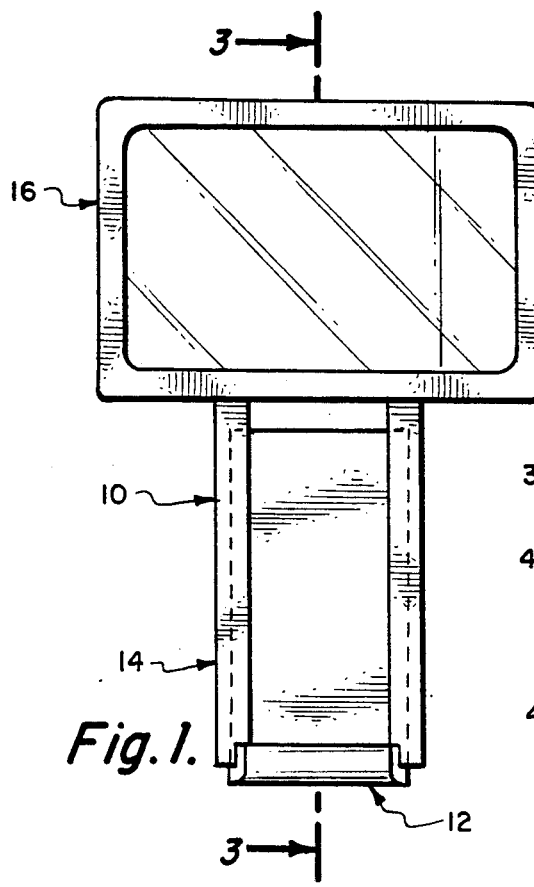
FIG. 1 is a front elevation of an auxiliary mirror constructed according to the invention.
Figure 3:
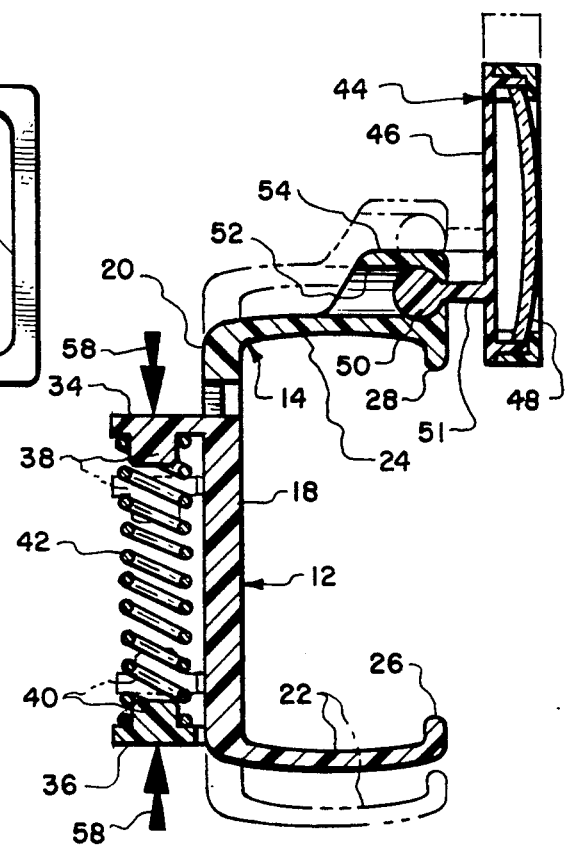
FIG. 3 is a sectional view of the auxiliary mirror taken at 3—3 of FIG. 1.
Figure 2:
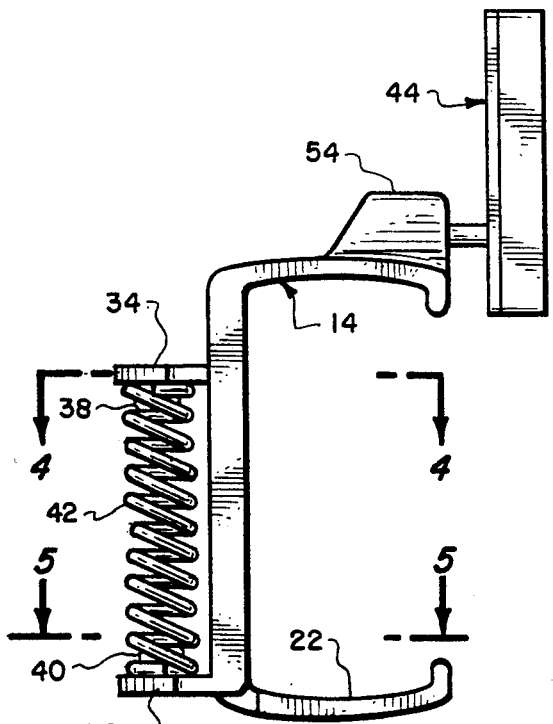
FIG. 2 is a side elevation of the auxiliary mirror of FIG. 1
Figure 4:
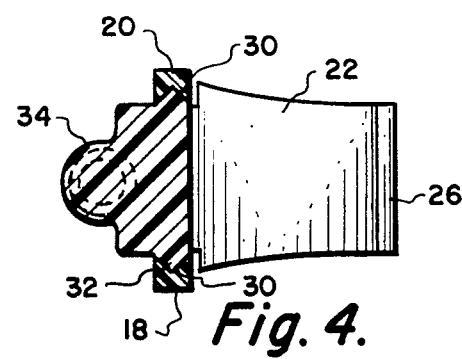
FIG. 4 is a sectional view of the auxiliary mirror taken at 4—4 of FIG. 2.
Figure 5:
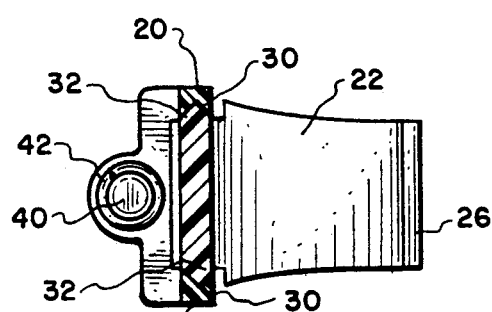
FIG. 5 is a sectional view taken at 5—5 of FIG. 2.

An auxiliary mirror that can be securely clamped to an existing rear-view mirror is shown in a first embodiment in FIGS. 1 through 5. The auxiliary mirror is intended to extend visibility beyond factory provided rear-view mirrors in vehicles. It is intended to improve visibility in the area of "blind spots" experienced by all vehicle drivers or operators. It also is helpful for viewing passengers in the rear seat, such as small children. Extended visibility is provided without distraction or interfering with the normal visibility provided by a rear-view mirror.

The present invention is an auxiliary rear-view mirror having a rectangular, slight spherical mirror that attaches easily to the existing vehicles factory equipped rear-view mirror. This mirror provides a minimum of interference and distraction and there is adequate movement and adjustment to meet individual needs. The mirror can be attached to either side of the rear-view mirror for preference and may be reversed to mount above or blow the rear-view mirror. The mirror portion of the auxiliary mirror is provided with the proper radius in both the horizontal and vertical planes to provide the most natural image with minimum distortion. The mirror is intended to be complimentary to and used in conjunction with a vehicle's factory equipped rear-view mirror.

An auxiliary rear-view mirror 10 is comprised of L-shaped support brackets 12 and 14 and an adjustable rectangular mirror 16.

Brackets 12 and 14 have back plates 18 and 20 that telescopically assemble as will be described in greater detail hereinafter. Each back plate also has an arm 22 and 24 terminating in a lip 26 and 28 for securing the auxiliary mirror to the frame of an existing rear-view mirror. Back plate 20 has a grooves 30 for receiving tongues 32 on back plate 18.

Ears 34 and 36 are provided with bosses 38 and 40 for securing coil spring 42. Optionally sockets not shown could be provided in ears 34 and 36 for holding spring 42. Spring 42 biases ears 34 and 36 away from each other drawings arms 22 and 24 together to securely clamp the supports 12 and 14 around the frame of an existing rear-view mirror as will be described in greater detail hereinafter. Lips 26 and 28 prevent the auxiliary mirror from slipping when installed.

Auxiliary mirror 44 is comprised of a frame 46 having a slightly spherically curved convex mirror 48 to provide a wide angle of view. The curvature of the mirror 48 is selected to provide the minimum distortion. Auxiliary mirror 44 is adjustable mounted on bracket 14 by ball 50 engaging socket 52 in hooded extension 54 provided on bracket 14. Ball 50 is joined to auxiliary mirror 44 by stem 51 allowing the mirror to be easily adjusted. The combination of ball 50 on stem 51 and socket 52 provide a gimbal joint allowing auxiliary mirror 44 to be easily adjusted in all directions.

The mounting of the auxiliary mirror on a rear-view mirror is illustrated by the optional embodiment shown in FIG. 6. To mount the embodiment in FIG. 1 on mirror 56 ears 34 and 36 are forced toward each other, for example by using the thumb and fore-finger, spreading arms 22 and 24 of brackets 12 and 14 apart allowing lips 26 and 28 to pass over the edges of mirror 56. Once arms 22 and 24 are placed around the frame of mirror 56 ears 34 and 36 are released and spring 42 forces brackets 12 and 14 toward a closed position as illustrated by arrows 58 in FIG. 3. This securely clamps the auxiliary mirror on existing rear-view mirror 56. As can be seen, the mirror can be clamped above or below rear-view mirror 56 on either side.

An alternate embodiment is illustrated in auxiliary mirror 60 of FIGS. 6 through 9. Auxiliary mirror 60 has a pair of brackets 62 and 64 that are held together by a bolt 68 and a finger nut 70. Bracket 62 has back plate 72 that is narrower than back plate 74 on bracket 64. Bracket 64 is provided with a recess 76 for receiving back plate 72 of bracket 62 so that arms 78 and 80 can be mounted in an opposing relationship. Lips 82 and 84 provide a catch to keep bracket on rear-view mirror 56.

Bracket 62 can be slid toward or away from bracket 64 when back plate 72 is mounted in slot 76. The brackets are secured on mirror 56 by bolt 68 having a flat sided head 86 fitting groove 88 in back plate 72. Slot 90 allows bracket 62 to move toward or away from bracket 64. The position of bracket 62 with bracket 64 is secured by sliding arms 78 and 80 toward or away from each other as indicted by arrow 92 and then securely locking their position by tightening finger nut 70 on bolt 68. This securely clamps the relative position of arms 78 and 80.

Convex auxiliary mirror 65 is mounted on bracket 64 by a ball 94 on stem 96 fitting socket 98 in hood 100 on bracket 64. Mirror 102 is a spherically curved mirror to provide a wide angle of view. The curvature is selected to provide the widest possible angle with the least distortion.

As can be seen from FIGS. 7 and 9 mirror 65 is adjustable in all angles to provide the best possible visibility for the back seat or to reduce or eliminate the blind spot.

The mirror is mounted on existing rear-view mirror 56 by loosening finger nut 70 and separating bracket 62 and 64 to open arms 78 and 80 allowing lips for flanges 82 and 84 to fit around the mirror frame. Once positioned on rear-view mirror 56 the two arms are brought together until arms 78 and 80 firmly abut the upper and lower edges of existing mirror 56. Finger nut 70 is then securely tightened clamping the auxiliary mirror and mounting system on existing rear-view mirror 56. With the embodiment shown the mirror can be placed above or below on either side of existing rear-view mirror 56.

Thus there has been disclosed an auxiliary mirror that easily mounts on existing rear-view mirrors and can be fitted on either side above or below the mirror. The auxiliary mirror provides visibility to view the back seat of a vehicle or to reduce or eliminate blind spots. The auxiliary mirror is securely clamped on the existing rear-view mirror, does not interfere or obstruct vision or distract the vehicle driver or operator.

This invention is not to be limited by the embodiment shown in the drawings and described in the description which is accordance with the scope of the appended claims.

What is claimed is:

1. An auxiliary mirror comprising;
a first L-shaped bracket;
a second L-shaped bracket;
said first and second L-shaped brackets each having a back plate and an arm;
means for slidably engaging said back plates of said first and second L-shaped brackets with said arms in opposing relationship comprising; a pair of lengthwise grooves along opposite edges of the back plate of one of said L-shaped brackets, a pair of lengthwise flanges forming tongues along opposite edges of the back plate of the other of said L-shaped brackets; said pair of lengthwise tongues constructed to fit said lengthwise grooves to adjustably position the opposing arms; said slidable means allowing continuous adjustment of said brackets and arms with respect to each other to securely fit and clamp on different size rear-view mirrors;
an adjustable convex mirror mounted on one of said brackets; and
biasing means biasing said arms toward each other to securely clamp said L-shaped brackets on a rear-view mirror, said biasing means for securely clamping said L-shaped brackets on an existing mirror comprising; an opposing ear on the back plate of each of said L-shaped brackets; spring means compressibly mounted between said opposing ears; said spring constructed to bias said opposing arms of said L-shaped bracket toward one another;
whereby said auxiliary mirror can be securely clamped on an existing rear view mirror.

2. The mirror according to claim 1 in which said convex mirror has a compound convex curvature.

3. The mirror according to claim 1 in which said ears include cylindrical bosses on opposing sides; said spring being a coil spring fitting over said respective cylindrical bosses.

4. The auxiliary mirror according to claim 1 including; a ball mounted on a stem; said stem being mounted on the back of said mirror; a socket on one of said L-shaped brackets; said mirror being mounted by pressing said ball into said socket; whereby said mirror is freely adjustable both vertically and horizontally.

* * * * *